(12) United States Patent
Fokkelman et al.

(10) Patent No.: US 9,942,754 B2
(45) Date of Patent: Apr. 10, 2018

(54) SYSTEM AND METHOD FOR TRANSMITTING TRANSMISSIONS

(71) Applicants: Joris Willem Fokkelman, Tegernheim (DE); Akos Semsey, Regensburg (DE)

(72) Inventors: Joris Willem Fokkelman, Tegernheim (DE); Akos Semsey, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/367,799

(22) PCT Filed: Dec. 11, 2012

(86) PCT No.: PCT/EP2012/075084
§ 371 (c)(1),
(2) Date: Jun. 20, 2014

(87) PCT Pub. No.: WO2013/092306
PCT Pub. Date: Jun. 27, 2013

(65) Prior Publication Data
US 2015/0215779 A1  Jul. 30, 2015

(30) Foreign Application Priority Data

Dec. 21, 2011 (DE) .................. 10 2011 089 496

(51) Int. Cl.
*H04W 12/06* (2009.01)
*H04L 9/32* (2006.01)
(Continued)

(52) U.S. Cl.
CPC ........ *H04W 12/06* (2013.01); *G07C 9/00896* (2013.01); *H04L 9/3226* (2013.01);
(Continued)

(58) Field of Classification Search
CPC ...... H04W 12/06; H04W 12/08; H04L 63/10; H04L 63/08; H04L 67/12; H04L 63/0471; H04L 9/3226
See application file for complete search history.

(56) References Cited

U.S. PATENT DOCUMENTS 6,694,259 B2   2/2004  Curbow et al.
6,988,034 B1   1/2006  Marlatt et al.
(Continued)

FOREIGN PATENT DOCUMENTS

DE         10009057        8/2001
DE   10 2006 042 358 A1   3/2008
(Continued)

OTHER PUBLICATIONS

Continental: Sesam öffne dich: Mit Continental werden Handys zu cleveren Autoschlüsseln. Pressemitteilung Nov. 13, 2011, (6 pages).
(Continued)

*Primary Examiner* — Yonas Bayou
(74) *Attorney, Agent, or Firm* — Cozen O'Connor (57) ABSTRACT

A system for transmitting transmissions in vehicles includes a first communication module for establishing a communication connection to a communication terminal of a supplier, which communication terminal receives authorization data by a communication network, a first identification routine for uniquely identifying a supplier, a second communication module for establishing a communication connection to a communication device of a control unit of the access assembly of a vehicle by wireless communication network, a second identification routine for uniquely identifying the system by the access assembly, a third communication module for receiving update request information of the driver, and an update routine for updating authorization data in a memory of the system.

6 Claims, 5 Drawing Sheets

(51) Int. Cl.
*H04L 29/08* (2006.01)
*H04L 29/06* (2006.01)
*H04W 12/08* (2009.01)
*G07C 9/00* (2006.01)
*H04W 88/06* (2009.01)

(52) U.S. Cl.
CPC .......... *H04L 63/0471* (2013.01); *H04L 63/08* (2013.01); *H04L 63/10* (2013.01); *H04L 67/12* (2013.01); *H04L 69/18* (2013.01); *H04W 12/08* (2013.01); *H04L 63/108* (2013.01); *H04L 67/125* (2013.01); *H04W 88/06* (2013.01)

(56) References Cited

U.S. PATENT DOCUMENTS

| | | | |
|---|---|---|---|
| 8,754,784 B2* | 6/2014 | Ji | G08G 1/143 340/932.2 |
| 8,843,307 B1 | 9/2014 | Kolodziej | |
| 8,994,560 B2* | 3/2015 | Anderson | G08G 1/143 340/901 |
| 9,286,740 B2* | 3/2016 | Kamps | G07C 5/0858 |
| 9,376,090 B2* | 6/2016 | Gennermann | B60R 25/20 |
| 9,478,134 B2* | 10/2016 | Narayanan | G08G 1/146 |
| 9,513,133 B2* | 12/2016 | Semsey | G07B 15/02 |
| 9,626,857 B2* | 4/2017 | Fokkelman | G06Q 10/083 |
| 9,652,908 B2* | 5/2017 | Fokkelman | G07C 9/00309 |
| 9,666,074 B2* | 5/2017 | Nicoll | G08G 1/143 |
| 2004/0243426 A1 | 12/2004 | Hashimoto | |
| 2005/0280555 A1 | 12/2005 | Warner, IV | |
| 2006/0049921 A1 | 3/2006 | Hara et al. | |
| 2008/0066186 A1* | 3/2008 | Hammes | B60R 25/2018 726/27 |
| 2008/0136674 A1* | 6/2008 | Jang | G08G 1/14 340/932.2 |
| 2010/0305779 A1 | 12/2010 | Hassan et al. | |
| 2011/0112969 A1 | 5/2011 | Zaid et al. | |
| 2011/0131154 A1 | 6/2011 | Faber et al. | |
| 2011/0241898 A1* | 10/2011 | Busch | G08G 1/14 340/932.2 |
| 2011/0249658 A1 | 10/2011 | Wohlert et al. | |
| 2012/0056758 A1 | 3/2012 | Kuhlman et al. | |
| 2012/0092190 A1 | 4/2012 | Stefik et al. | |
| 2012/0127308 A1 | 5/2012 | Edlershaw et al. | |
| 2012/0203600 A1* | 8/2012 | Fiorucci | G06Q 30/0226 705/13 |
| 2013/0135118 A1 | 5/2013 | Ricci | |
| 2013/0179061 A1 | 7/2013 | Gadh et al. | |
| 2014/0306833 A1 | 10/2014 | Ricci | |
| 2015/0061895 A1 | 3/2015 | Ricci | |
| 2016/0025503 A1 | 1/2016 | Kees et al. | |
| 2016/0063863 A1 | 3/2016 | Stefik et al. | |

FOREIGN PATENT DOCUMENTS

| | | |
|---|---|---|
| DE | 102007042412 | 3/2009 |
| DE | 102011018901 | 10/2011 |
| EP | 1 564 690 | 8/2005 |
| WO | WO 2010/010314 A1 | 1/2010 |

OTHER PUBLICATIONS

Continental: Sesam öffne dich: Mit Continental warden Handys zu cleveren Autoschlüsseln. Pressemitteilung Nov. 13, 2011, (6 pages).
Notice of Allowance dated Aug. 23, 2016 which issued in the co-pending U.S. Appl. No. 14/654,343.

* cited by examiner

SYSTEM AND METHOD FOR TRANSMITTING TRANSMISSIONS

CROSS-REFERENCE TO RELATED APPLICATIONS

This is a U.S. national stage of application No. PCT/EP2012/075084, filed on 11 Dec. 2012, which claims priority to the German Application No. 10 2011 089 496.9, filed 21 Dec. 2011, the content of both incorporated herein by reference.

BACKGROUND OF THE INVENTION

1. Field of the Invention

The present invention relates to a system and a method for delivering mailings.

2. Related Art

Delivery services which must distribute or collect mailings such as packages or letters go to great effort to get from delivery address to delivery address, as a result of which a lot of time lapses and the driving profiles for the delivery vehicles are rather unfavorable.

The term "mailing" is understood as meaning all documents or articles that can be delivered to a recipient or can be collected from a sender for transport to a delivery address with the aid of a company. These include, for example, letters, small shipments and money transfers. The mailings are usually delivered to the residential address of the person in question. A postal recipient of a mailing is that person who is named at the address and for whom a mailing is intended. This may be a natural or legal person, for example an institution, a body or a company. A residential address is the postal address of a residence in which a person permanently resides. This may be the main residence or the secondary residence. A residential address generally consists of the statement of the street, the house number, the location and the country. The apartment or room number or the floor, the part of the building (for example back building) and a subtenancy ("care of" or "c/o") are sometimes also stated. In order to send mailings, the residential address also includes the zip code and possibly the district or neighborhood. If the residential address is in an estate, the estate name with the house number is mentioned instead of the street.

A postal recipient is also understood as meaning the person who actually receives a mailing. This person may, but need not, be the addressed person (addressee). This person may have been instructed by the recipient to receive the mailing. Mailings are usually placed in the home mailbox. Particular mailings, for example those with the mailing form "by registered letter" or with a "delivery certificate", are generally delivered directly to the recipient, as are telegrams and express deliveries. Some mailings, for example packages which cannot be delivered, are not deposited in the mailbox. In these cases, the recipient receives a notification card.

It often occurs that the person in question cannot be found at the residential address during delivery and a notification (already mentioned) stating how, where and when the mailing can be delivered again is left behind by a postal or delivery service. These inefficient logistics produce additional environmental impact and costs because, for example, the engines in the delivery vehicles are often used outside the optimum operating range. Furthermore, the delivery vehicles are often a traffic obstruction because the drivers rarely look for a parking space for the short stopping times but rather simply stop with hazard lights and it is necessary to repeatedly approach the residential address in order to deliver the mailings.

Vehicles have often been equipped with so-called "keyless entry access units" in the meantime which make it possible to unlock/lock the vehicle from the outside by radio. This requires a control unit located in the motor vehicle that communicates, via radio signals, with an external unit that is usually integrated in a key or in an authorization card for the vehicle. The control unit in the vehicle and the external unit (also called external identification unit) usually carried by the driver enter radio contact after both have been activated. Both units then interchange data containing a stored code via radio. If this code matches between the identification unit and the control unit, the vehicle is unlocked or locked by the authorized driver.

SUMMARY OF THE INVENTION

An object of the invention is to provide the delivery of mailings or ordered goods with a smaller amount of logistical effort.

The object is achieved by the features of the system according to the invention as set forth herein. The method for delivering mailings can also be used such that a supplier can also collect mailings stored in a vehicle without the functionality of the system or method according to the invention needing to be changed.

One preferred embodiment of the system for delivering mailings in vehicles is distinguished by the fact that this system obtains from a first communication module M1 for setting up a communication connection to a communication terminal belonging to a supplier of the authorization data via a communication network N1, a first identification routine for uniquely identifying the supplier, a second communication module M2 for setting up a communication connection to a communication device of a controller of the access arrangement of a vehicle via a wireless communication network N2, a second identification routine for uniquely identifying the system by the access arrangement, a third communication module M3 for receiving an item of update request information relating to the driver, and an update routine for updating authorization data in a memory.

In one advantageous refinement of the system, the wireless communication network N2 is a mobile radio communication network. In another particularly advantageous refinement of the system, identifying the user by voice recognition, by transmitting an item of identification information—PIN/TAN—, or by a challenge-response method, are provided.

Another refinement is distinguished by the fact that identifying the supplier by using an item of unique cryptographic information are provided.

One particularly advantageous embodiment of the system sets up a communication connection via the wireless communication network N2 via a mobile radio communication network and/or a WLAN network, which may also be in the form of vehicle-to-vehicle or vehicle-to-infrastructure communication.

In another very secure embodiment, encrypting the communication between the communication device of the system and the communication device of the access arrangement by using a common secret are provided.

The object is also achieved by the method for delivering mailings in vehicles. In this case, the vehicle is registered as a first step. The position of the vehicle is then determined, and a position of the parked vehicle is then released as a delivery address to the system via a communication network N2 using a communication device. The position of the parked vehicle is transmitted via a communication network N2 using a communication unit. Furthermore, the authorization release for opening at least one door and/or a trunk of the vehicle by a supplier is transmitted to a communication terminal belonging to the supplier via a communication device of the system, the opening operation being valid within a particular time window. A radio signal which contains an authorization release is transmitted, the access arrangement activating opening of at least one door and/or a trunk of the vehicle when the authorization is present, and, after an opening operation has been carried out and after the mailing has been delivered by the supplier manually closing a door and/or the trunk of the vehicle, a confirmation of the delivery of the mailing by the supplier is given to the communication terminal belonging to the driver via the communication network N2 using the communication device via the system. After an update request has been transmitted by the communication device belonging to the driver, authorization data are updated in the controller of the access arrangement.

In one advantageous refinement, the delivery can be notified by virtue of the vehicle using the communication device to transmit an SMS, an email or another electronic message relating to the successful delivery or deliveries which have not been made within the predefined time window to the driver, in the form of a data packet, on the communication terminal via the communication network N2. If the driver opens the vehicle, he receives, via the access arrangement, a short message stating that a new delivery has been received or a package has been collected by a particular time, which message is acoustically or visually presented on the screen of the communication terminal. During the output indicating that a delivery has been made, the invention envisages that a warning is output during alighting if delivered goods are still in the trunk, for example. This is intended to remind the driver that he should not forget the delivered goods in the vehicle when leaving the vehicle.

In another advantageous refinement, the delivery which has been made is confirmed by virtue of the vehicle emitting a confirmation to the system after a delivery and after the trunk or doors has/have been closed in order to signal that the vehicle is locked again. If the vehicle is not locked again in a period of time, the communication terminal belonging to the supplier receives, via the system, a warning message indicating that the vehicle has not been properly locked.

The invention envisages that visual, acoustic or sensory documentation of the delivery is effected using an on-board camera. For this purpose, it is envisaged that, if the vehicle is opened, cameras situated in the vehicle and installed in the vehicle for these or other purposes take photographs or record a movie and are triggered by the access arrangement. It is also envisaged that cameras are installed in the trunk. The use of cameras installed on account of blind-spot detection, parking assistance, support for adaptive restraint systems, sleep warning systems or other purposes and actuated by the access arrangement if the trunk or the doors is/are opened is particularly advantageous. The movies or photographs can avoid or clarify the possible cases of misuse. Sensor values from acceleration sensors or so-called structure-borne sound sensors or microphone signals are likewise used to document the completed delivery of the mailing.

In another advantageous refinement, the position of at least one free parking space is calculated, starting from the current position of the vehicle, on the basis of vehicle-to-vehicle and/or vehicle-to-infrastructure communication and is transmitted to a navigation apparatus of the vehicle. In this case, the navigation apparatus can transmit the position to the system using the communication devices.

Another refinement of the method according to the invention is distinguished by the fact that the position of the free parking space is transmitted to the navigation apparatus when the vehicle is in a predefined area with respect to the free parking space, preferably in the vicinity of a barrier of a parking facility.

In one very advantageous refinement, after the vehicle has been parked in a selected free parking space, the position of the selected parking space is transmitted to a storage medium that can preferably be transported by the driver, preferably a key for the vehicle and/or a mobile telephone belonging to the driver and/or a chip card, and then stored on the storage medium and preferably additionally displayed.

One advantageous refinement is distinguished by the fact that the navigation apparatus or the storage medium transmits the position to the system of the selected parking space via a parking space management system of the parking facility.

In another refinement, when the selected parking space is left, the position of the parking space which is now free again is transmitted to the system via the parking space management system of the parking facility.

In another advantageous refinement, the position of the at least one free parking space is calculated from a distance measurement from at least one vehicle or at least one infrastructure element to other vehicles or to other infrastructure elements which are arranged within a perimeter with a predefined radius around the vehicle looking for a free parking space.

In one advantageous refinement, further information relating to the parking space situation, preferably relating to residential parking zones or stopping restrictions, is transmitted from the at least one infrastructure element and/or is provided from a digital map from the navigation apparatus and is used to calculate the position of the at least one free parking space.

In another refinement, the supplier is identified by voice recognition, by transmitting an item of identification information—PIN/TAN—, or by a challenge-response method. In another refinement, the system is identified by using an item of unique cryptographic information.

In another particularly advantageous embodiment, the communication connection is set up via the wireless communication network N2 via a mobile radio communication network and/or a WLAN network.

In another advantageous refinement, the communication between the communication device of the system and the communication device of the access arrangement and the communication device belonging to the supplier is encrypted by using a common secret.

One advantage of the method according to the invention is that logistical synergy effects are produced by a management of locations of the vehicles to be found since a high degree of automation is effected for delivering the mailings to the relevant vehicles. The invention achieves a reduced outlay in terms of the delivery time and energy consumption with all environmentally friendly ancillary effects for a delivery service.

Another aspect of the invention is that a communication connection is set up between an authorized supplier, who receives the corresponding authorization data from the system according to the invention, and the access apparatus of the vehicle. If the system or the mobile terminal belonging to the supplier has been successfully identified, the authorization data are updated and accordingly activated in the controller of the access arrangement for the supplier's delivery operation, with the result that the mailing in the trunk or in the passenger compartment is approved for the supplier by the authorized approval of the opening of the vehicle doors or tailgate of the trunk using the controller, with the result that the mailing can be reliably delivered here. According to the invention, the trunk is the space in the vehicle which is intended for the transportation of cargo. It is generally situated at the rear, but some vehicle types have it at the front. In automotive engineering, the space in which the vehicle occupants are situated is referred to as the passenger compartment.

Furthermore, after being initiated by the driver, the method can be carried out by the system in a fully automated manner, that is to say quickly and without the cost-incurring use of personnel. Costs are also reduced by the use of an existing mobile radio infrastructure and the possibility of implementing this largely with the aid of commercially available server components. In addition, the risk of incorrect inputs is minimized as a result of automation. Another advantage of the invention is the possibility of being able to update the authorization data directly using a mobile terminal belonging to the driver and belonging to the supplier.

The vehicle according to the invention provides a reliable and secure possible way of a supplier being able to open the trunk, for example, but without critically jeopardizing theft protection. An alternating code method can be used, which can only be used once only by the supplier in a time window and expires after having been used once.

The vehicle or the driver uses communication connections to register with an infrastructure unit, for example a parking garage management system, which is connected to the system according to the invention, the system according to the invention being informed, with this registration, of when and where the vehicle is parked in order to be able to receive a mailing via a supplier. In this case, the infrastructure and the information service produced in this manner advantageously ensure that the deliveries can be made in an optimized manner by the delivery service by optimized bundling of mailings.

As a result of the transmission of the authorization to open the relevant vehicle, it is also envisaged that, when transmitting the authorization from the mobile terminal belonging to the supplier or from the delivery vehicle networked thereto, all vehicles in the vicinity expecting a delivery will respond with a light signal to the radio signal generated by the supplier. This facilitates the finding by the supplier in order to quickly find the vehicles in question, in which case, as already mentioned, it is possible to open the trunk or the doors only using the special individual alternating code.

BRIEF DESCRIPTION OF THE DRAWINGS

The method according to the invention is explained in more detail below using drawings, in which.

DETAILED DESCRIPTION OF THE PRESENTLY PREFERRED EMBODIMENTS

Figure 1:
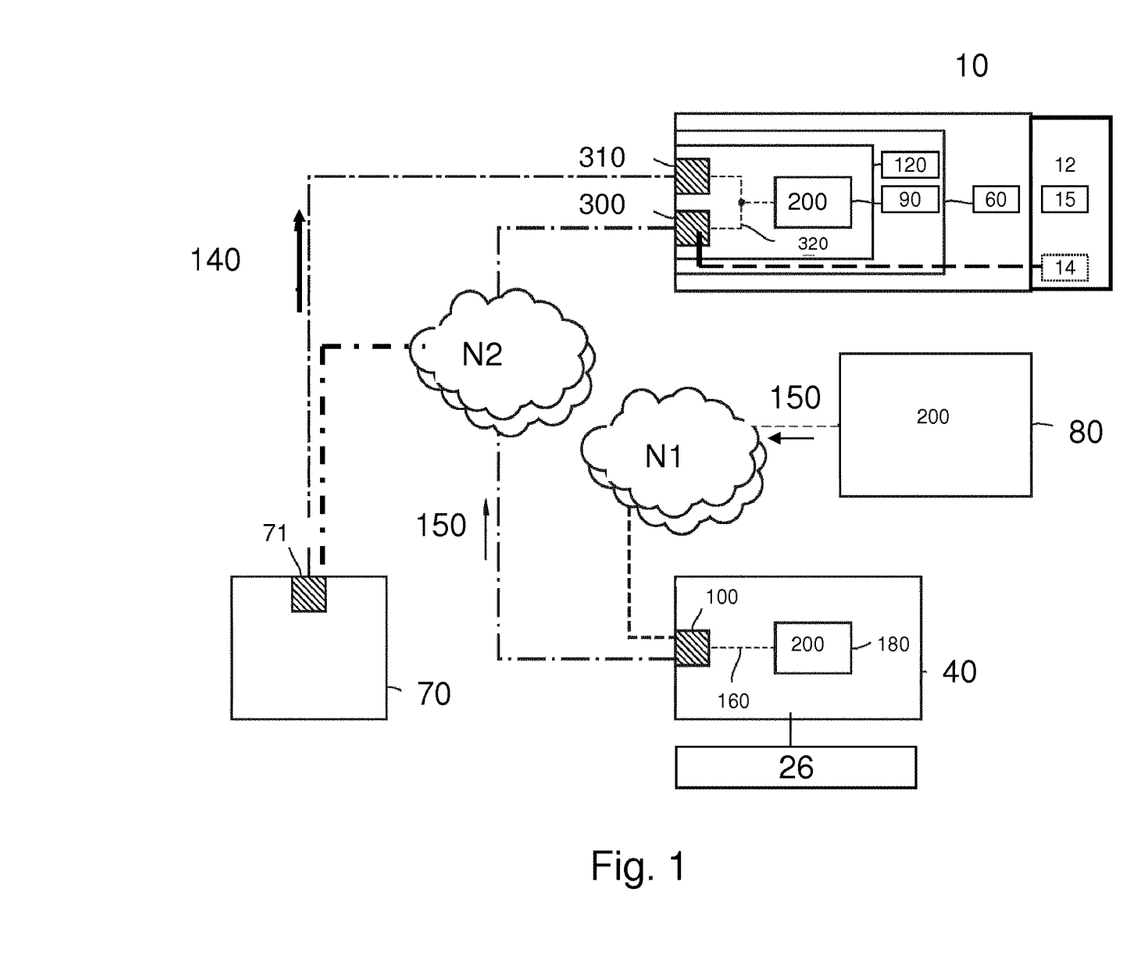
FIG. 1 schematically shows a vehicle having a communication apparatus and a schematic illustration of an arrangement for implementing the method according to the invention and the system.

A vehicle 10, for example an automobile or a truck, which is illustrated in FIG. 1 and is intended to be parked in a parking space, is equipped with a positioning system, for example a GPS system 12, which comprises a computation apparatus 14 and a navigation apparatus 15. FIG. 1 has a system 40 for delivering mailings. For this purpose, authorization data 200 in an access arrangement 60 of a vehicle 10 and a communication terminal 70 belonging to the supplier are updated. The system 40 may be a server-based solution having the conventional components and peripherals such as a processor, a memory, a network connection, an operating system, application software etc. (not illustrated). In addition, a first communication network N1 and a second communication network N2 are depicted.

The communication terminal 70 belonging to the supplier is, for example, a mobile radio terminal, a multifunctional smartphone, a chip card or a similar terminal capable of radio communication, and has a memory and has at least one communication device 71. The system 40 has a communication device 100 via which the system can communicate both with the communication network N1 and with the communication network N2. In addition, in the system 40, the communication device 100 is connected to a data module 180, via a data bus 160, using relevant communication protocols. This data module 180, or another competent device, originally allocated or managed the authorization data 200. The communication terminal 80 belonging to the driver is likewise connected to the communication network N1, for example in a wireless manner.

The vehicle 10 has an access arrangement 60. This access arrangement 60 has a controller 120. This controller 120 is connected to the communication network N2 via a communication device 300. The authorization data 200 from authorized suppliers are likewise stored in the controller 120 in a memory 90 of the access arrangement 60.

The mobile terminal or communication terminal that belongs to the supplier 70 and has a communication device 71 is also illustrated. This mobile terminal makes it possible to transmit a coded and encrypted radio signal 140 to a communication device 310 of the controller 120 of the access arrangement 60 using the communication device 71 of the mobile terminal. A radio signal is understood as meaning a communication signal based on electromagnetic signals, including optical signals (for example infrared light). The vehicle 10 reacts to a particular encrypted radio signal 140 from the communication terminal 70 belonging to the supplier, which radio signal is preferably limited to a particular time window and is invalidated after the opening commands have been used. The radio signal 140 gives access authorization, but not driving authorization, to start the vehicle. An active alarm system (not depicted) is modified, according to the invention, for the period of time in which the mailing is delivered to the vehicle 10 in an authorized manner in such a way that an alarm is not triggered.

Different functions of the access arrangement 60 can be triggered with the aid of the radio signal 140. This may be, for example, the opening or closing of the door locking system or the trunk locking system. In this case, certain information is associated with the communication terminal 70 belonging to the supplier and user data 200 determined, for example, by the data module 180 of the system are associated with the controller 120 and are stored. These make it possible to operate the access arrangement 60 of a particular vehicle 10 only using a particular communication terminal 70 belonging to the supplier. The memory 90 and the communication devices 300 and 310 are connected to one another, via a data bus 320, using relevant communication protocols.

Data packets, which may comprise, as a first data element, a vehicle identification, the vehicle color, vehicle type, vehicle license plate, a digital identification code or a telephone number and may comprise, as a second data element, the vehicle position or a URL to a service, such as an IP-based parking space management system 26 where the vehicle position can be queried, and may comprise, as a third data element, an access code which enables profiled access for the supplier but does not give any driving authorization and loses its validity after a particular time are transmitted in the radio signal. Alternatively, further data fields are occupied such as "search code", "approval for door opening", "cooling of the mailing required after opening of the vehicle".

The communication terminal 80, which belongs to the driver and is likewise a cell phone, a smartphone, a multi-function automobile key or a chip card contains, or receives from the vehicle 10 via the system 40, a particular number of access codes that can be used by the driver during purchasing, for example. If the driver wishes to pay for and have something delivered, an access code of the vehicle 10 is communicated from the communication terminal 70 belonging to the driver to a device at the checkout of the relevant store to the system 40 via the communication network N1 or N2. In this case, the access codes may have a validity period of a few hours and can no longer be used after this period expires.

In this variant of allocating the authorization, the vehicle 10 need not necessarily be directly networked to the environment. The access codes prepared in the communication terminal 80 belonging to the driver receive their validity upon alighting in which the period of the alighting time+X hours are determined, where X hours are the length of time spent in the parking space for the duration of the purchase, which length of time is input by the driver in a predetermined manner using a human machine interface (HMI) (not illustrated) of the vehicle 10 and is then transmitted to the communication terminal belonging to the driver 80.

After the authorized supplier has been uniquely identified, the communication device 100 of the system 40 then establishes the authorization data 200 and a communication connection to the communication device 300 of the controller of the access arrangement 60 via the communication network N2.

The communication terminal 70 belonging to the supplier is now uniquely identified by the controller 120 of the access arrangement 60. This may be effected, for example, by using a unique cryptographic key. In this case, it is not necessary for this step to take place, in terms of time, immediately after the identification of the supplier and the stipulation of the requirement update.

One possible way of identifying and authenticating the communication terminal 70 belonging to the supplier by the controller 120 of the access arrangement 60 is, for example, a challenge-response method. In this case, it is assumed that the controller 120 of the access arrangement 60 and the communication terminal 70 belonging to the supplier have a common cryptographic secret. This secret is expediently produced when the driver first registers with the system 40, either by the controller of the access arrangement 60 or by the system. The secret is then stored in the memory 90 in the controller 120 and in a memory 90 in the system. After commencing communication between the communication terminal 70 belonging to the supplier and the controller SG via the communication network N2, the controller 120 will send a request—challenge—to the system and to the communication terminal 70 belonging to the supplier, from which the system and the communication terminal 70 belonging to the supplier calculate the answer—response—with the aid of the cryptographic secret and send it back to the controller SG of the access arrangement 60 via the communication network N2. This method also has the advantage that the subsequent further communication between the system, the communication terminal 70 belonging to the supplier and the controller 120 via the communication network N2 for transmitting the update request 700 can also take place in an encrypted manner using the common secret and it is therefore not necessary to assume that the protocols running via the communication network N2 provide sufficient data security per se.

The simpler method for identifying and authenticating the system by the controller SG of the access arrangement 60 is the use of a PIN code, possibly together with a TAN code that can be used once. These codes, that is to say the PIN and possibly a sufficient quantity of TAN codes, are expediently produced when the driver first registers with the system 40, either by the controller 120 of the access arrangement 60 or by the system 40, and are stored in the memory 90 of the controller 120 and the system 40. In this case, communication takes place in an unencrypted manner and it is assumed that the protocols running via the communication network N2 provide sufficient data security.

Alternatively, the radio signal may be divided between the communication terminal 80 belonging to the driver and the communication terminal belonging to the supplier 70 in such a manner that the transmitted data packets between the driver and the supplier in the access arrangement 60, with the result that the data packet is partially transmitted by the driver's cell phone or by email or comparable technology, is partially stored with the supplier and the two partial packets only together produce an access code or authorization data 200. This method advantageously prevents an access code from being eavesdropped during transmission and prevents the vehicle 10 from being opened in an unauthorized manner.

In one variant of this method, the system 40 itself does not store any identification data. Rather, after communication has been set up between the system and the controller 120, the system 40 transmits the identification data relating to the supplier to the controller 120.

In this case, the identification data (for example PIN code or TAN codes) are stored, on the one hand, in the memory SP of the controller 120. On the other hand, the data are known to the supplier or are stored, for example, in a memory 90 in his communication terminal 70.

After the system 40 has been uniquely identified with respect to the controller 60, the driver's update request 700 is transmitted from the communication device 100 of the system to the communication device 300 of the controller 60 via the communication network N2. The authorization data 200 in the memory 90 of the controller 120 of the access arrangement 60 are then updated in accordance with the update request 700.

Figure 2:
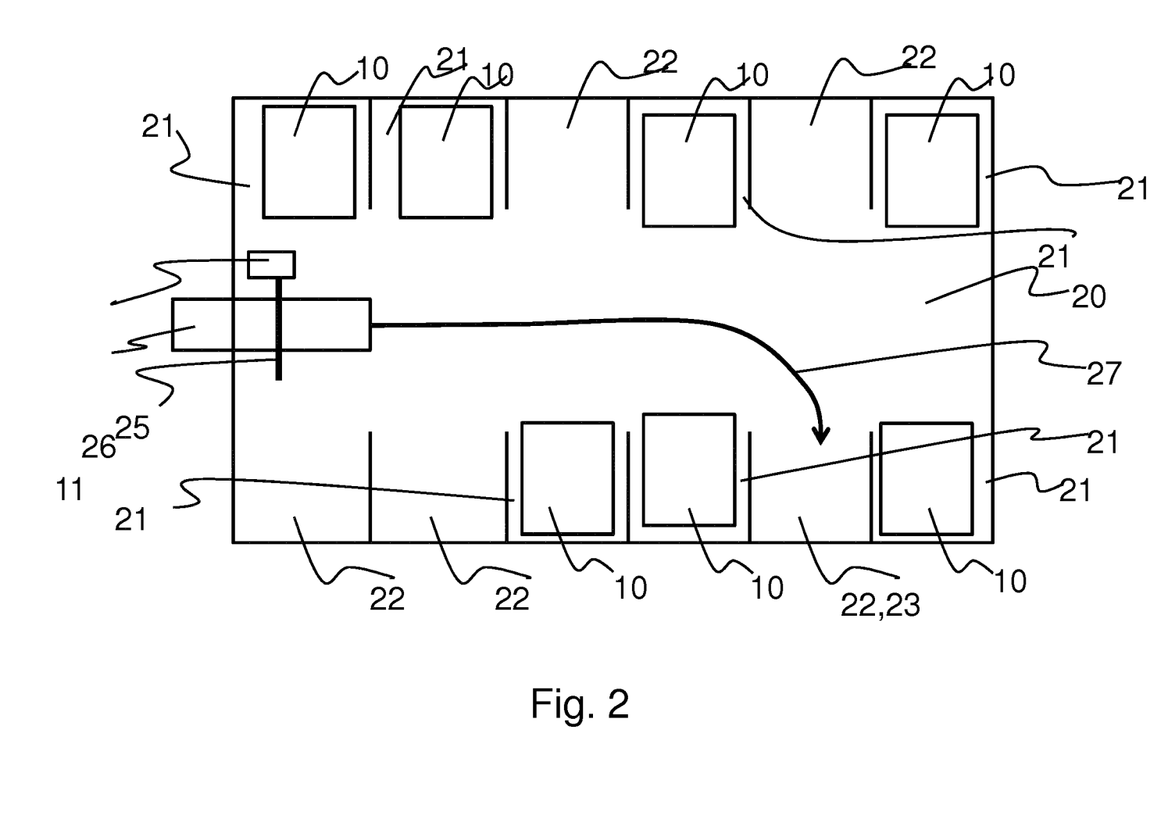
FIG. 2 schematically shows a first exemplary embodiment of the use of the method according to the invention in a parking facility.

FIG. 2 illustrates a vehicle looking for a parking space. If a vehicle 11 arriving at a parking facility, for example a parking garage 20 illustrated in FIG. 2, is looking for a parking space, the vehicle is first of all situated at an entrance barrier 25 for the parking garage 20. The arriving vehicle 11 is equipped in a similar manner to the vehicle 10 illustrated in FIG. 1.

The parking garage 20 has parking spaces 21 which are occupied by vehicles 10. In contrast, the parking spaces 22 are free, with the result that a vehicle can be parked therein.

At the entrance barrier 25 of the parking garage 20, short-distance radio (for example infrared, Bluetooth, DSRC, ITS-G5, WLAN, etc.) is used to transmit information relating to which parking spaces 22 are free from the parking space management system 26 integrated in the entrance barrier 25 to the computation apparatus 14 of the vehicle 11 via the communication connection, that is to say using vehicle-to-infrastructure communication, using the communication devices 300/310. The positions of the free parking spaces 22 can be stated, for example, as absolute positions of the GPS system 12 or as relative positions, for example with respect to the position of the barrier 25.

After the information relating to free parking spaces 22 has been transmitted, the GPS system 12 is changed to the so-called parking garage mode. The computation apparatus 14 now uses the data transmitted by the parking garage to calculate the positions of the free parking spaces 22 in the reference system of the vehicle's own GPS system 12 and presents these positions to the driver on a special display created for this mode. The driver can now select a parking space suitable for him for his vehicle 11 and can confirm the release of this position as a delivery location.

Route guidance to a parking space 23 selected by the driver, for example, can then be determined using the navigation apparatus 15, which receives the calculated position data from the computation apparatus 14, and can be made available to the driver. The driver then moves his vehicle to the selected parking space 23 using the calculated route guidance 27 and parks his vehicle 11 there. The route guidance is advantageous, in particular, in large, confusing and heavily frequented parking facilities, for example multistory parking garages.

If the vehicle 11 is now parked in the selected parking space 23 in the parking garage, the navigation apparatus 15 of the vehicle 11 stores its position. This function can be triggered, for example, by switching off the engine at the position of the selected parking space 23. The noted position of the parking space 23, which is now occupied, is transmitted by the navigation apparatus 15 to the memory 90 or, via the communication device 300, to the system 40 and the key for the vehicle, to a mobile telephone belonging to the driver or to another device (for example chip card) having an option of preferably wireless communication for the driver 80. The position of the parking space 23 can be displayed on the storage medium in the communication terminal 80 belonging to the driver on request. As a result, the driver can find his vehicle 11 again more quickly when returning to the latter.

The driver now leaves the parking garage 20. At the exit, the system 26 records the parking space of the vehicle 11, for example by querying the storage medium. Since the storage medium has stored the position of the vehicle 11 or the selected parking space 23, it transfers this to the parking space management system 26 of the parking garage 20. The parking space management system 26 now knows that the parking space 23, which has been selected by the driver, and the position of which has been transmitted to the parking space management system 26, is occupied. The parking space management system 26 also transmits this position to the system 40 for verification since this again checks whether the vehicle is also situated where the driver has parked it during confirmation as the delivery location.

After some time, the driver returns to the parking garage 20 in order to continue his journey with his vehicle 11. Alternatively, the driver can also directly type/set the alphanumeric parking mark, which is indicated at the parking space and which was identified by the driver when parking the vehicle, in the memory of his communication terminal 80.

In one preferred exemplary embodiment, the parking garage 20 contains a multiplicity of reading points at which the position of the vehicle 11 can be transmitted from the storage medium. Such a reading point is situated, for example, at the barrier 25 and/or at the doors and/or pay stations of the parking garage. The position of the vehicle 11, and possibly the way there, are indicated at such a reading point upon request of the driver, with the result that the driver can transmit his vehicle 11 the position of the parked vehicle to the delivery service and the driver can quickly find his vehicle again. The position of the vehicle 11 in the parking space 23, which is stored in the navigation apparatus 15, is preferably also used as the starting position for the next route which is calculated by the navigation apparatus 15. The position of the parking space 23, which has become free, is transmitted by the storage medium or the navigation apparatus 15 to the parking garage management system 26 by short-distance radio when the vehicle 11 exits. The parking space management system 26 now knows that the corresponding parking space 23, in which the vehicle 11 had previously been parked, is now free again.

Instead of the short-distance communication with the parking garage management system 26, communication can also take place with a corresponding parking space management server via GPS, UMTS, LTE, WiMax, WLAN etc.

The proposed method can be implemented in the vehicle with comparatively little technical effort and without additional hardware.

Figure 3:
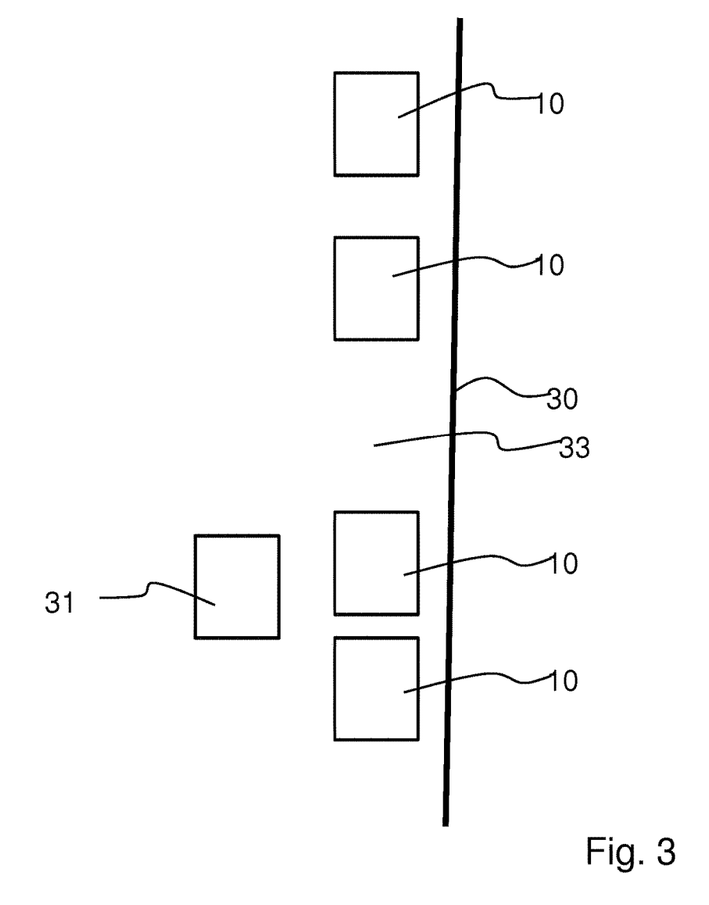
FIG. 3 schematically shows a schematic illustration of the system according to the invention in an access arrangement.

A further exemplary embodiment illustrated using FIG. 3 explains how the position can be determined for statement as a delivery location in the inner-city area of cities.

The method illustrated using FIG. 3 is used to find parking spaces, for example at the edge 30 of a road, and is therefore used to determine a delivery location. Many vehicles 10, which correspond to the vehicle 10 illustrated in FIG. 1, park here. The vehicle 31 looking for a parking space also has an identical structure.

In order to implement the method according to the invention, it is advantageous if the vehicles 10, 31 have distance sensors which are mounted at the front, at the rear or on the side of the involved vehicles 10, 31, for example ultrasound, infrared, radar sensors, camera, etc. The vehicles 10, 31 can also carry out vehicle-to-vehicle communication and/or vehicle-to-infrastructure communication via the communication devices 300/310 using the computation unit 14. There is also a navigation apparatus 15.

During the search for a parking space, the driver of the searching vehicle 31 first of all establishes a connection to vehicles 10 in a perimeter with a predefined radius around the vehicle 31 using a button or a command. As a result, the vehicles 10 which have already been parked in the perimeter are "woken" from a so-called sleep mode (inactive state) and changed to the active state. The vehicles 10 which are now in the active state then measure their distances from the respective nearest vehicle 10 or from the nearest infrastructure device (not illustrated), for example a traffic light or a traffic sign, to the front, to the rear and/or to the sides.

The distance data determined are transmitted from the vehicles 10 in the perimeter to the computation apparatus 14 of the vehicle 31 looking for a parking space using vehicle-to-vehicle communication. Furthermore, the positions of the respective vehicles 10 are transmitted to the computation apparatus 14 of this vehicle 31. The computation apparatus 14 of the GPS system 12 can now use the information transmitted using C2C communication to determine the respectively available area for parking. If this is sufficiently large, the corresponding free space is classified as a parking space and is indicated to the driver as a parking space available for parking. In the situation illustrated in FIG. 3, the parking space 33 represents such a parking space. After the vehicle 10 has occupied the parking space, this position is transmitted from the GPS system 12 to the system 40 via the communication device 300.

The navigation apparatus 15 can use the data determined by the computation apparatus 14 to calculate the route from the current position of the vehicle 31 looking for a parking space to the free parking space 33 and can provide the driver with the route in order to quickly find the parking space. If there are a plurality of free parking spaces in the perimeter of the vehicle 31, they can be displayed on a display of the computation apparatus 14, with the result that the driver can select a parking space appropriate for him.

Figure 4:
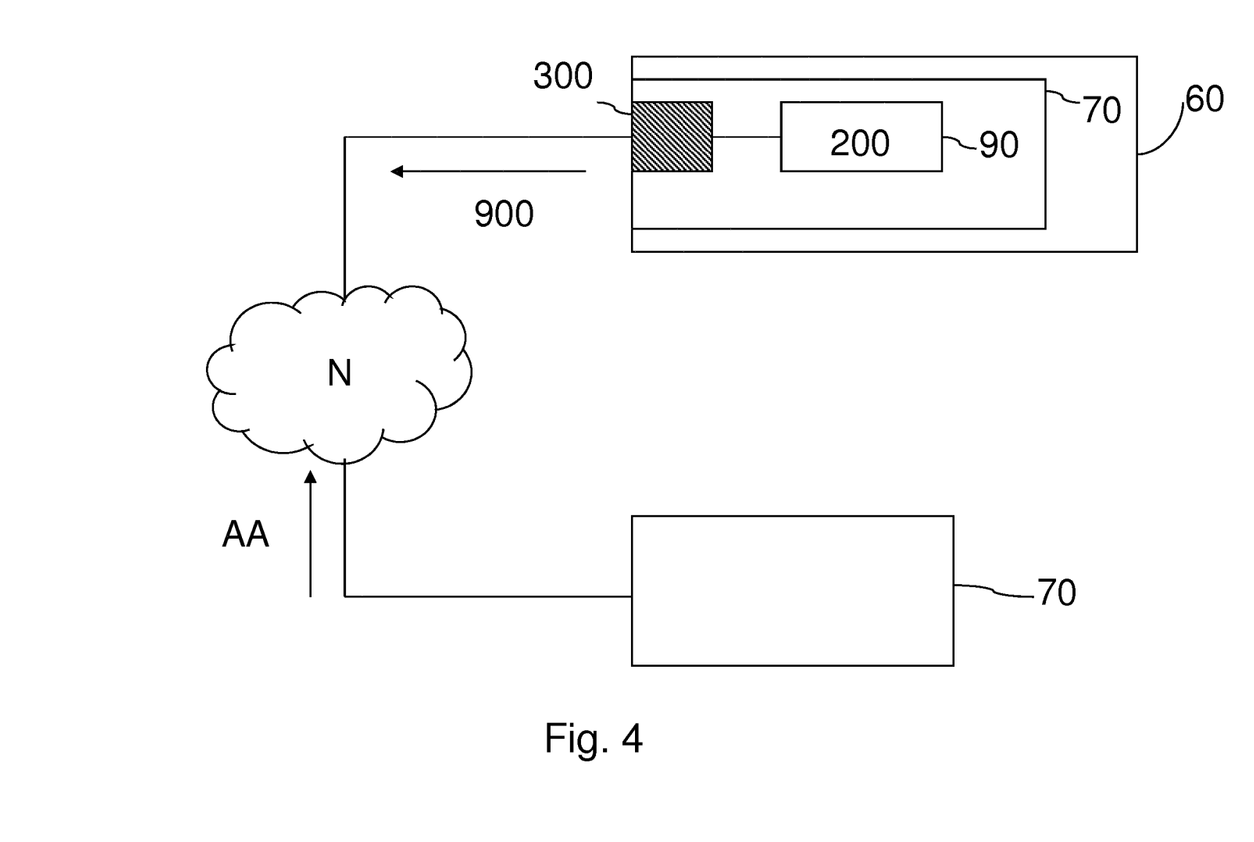
FIG. 4 schematically shows a schematic illustration of an arrangement of the method according to the invention, in which the update is initiated via a mobile radio telephone.

FIG. 4 shows a schematic illustration of an access arrangement 60 of the method according to the invention, in which the updating of the authorization data 200 is initiated via a mobile radio telephone 70 belonging to the supplier. A mobile radio communication network N, the access arrangement 60, the controller 60, the memory 90 and the communication device 300 of the controller 120 are also illustrated.

Figure 5:
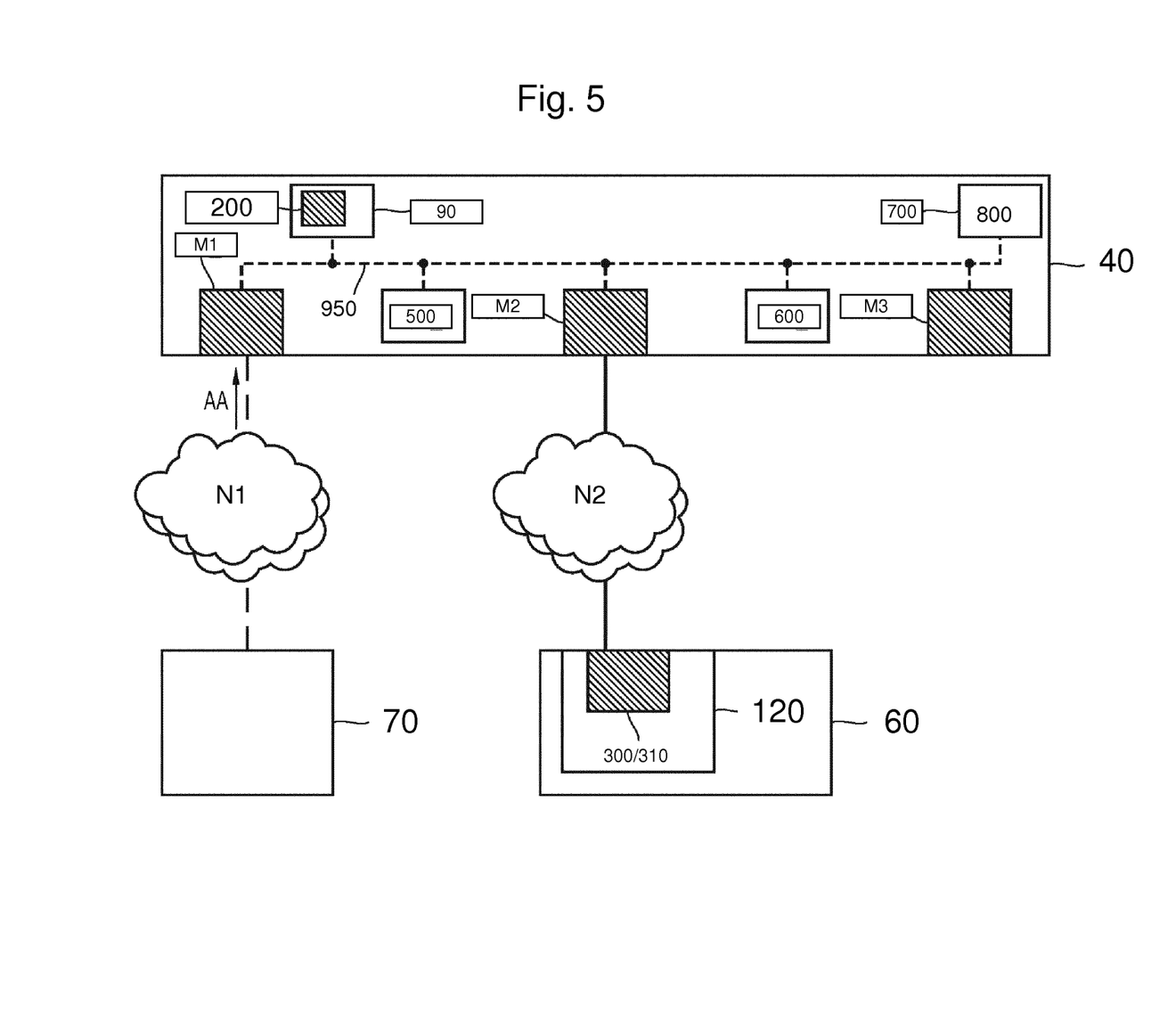
FIG. 5 schematically shows a schematic illustration of an arrangement for implementing the system according to the invention.

According to the invention, in this exemplary embodiment, also making reference to FIG. 5, it is possible for the authorized supplier to update the authorization data 200 in the access arrangement 60 even without the aid of a service center. For this purpose, the mobile radio terminal 70 belonging to the authorized supplier first of all sets up a connection to the communication device 300/310 of the access arrangement 60 via the mobile radio communication network N. The authorized supplier is then uniquely identified. This can be carried out in different ways. According to the invention, the controller 100 can generate an authorization code 900 and can send it, for example in the form of a short message—SMS—, to the mobile radio terminal 70 belonging to the authorized supplier via the communication device 300/310. This authorization code 900 is stored in a memory in the mobile radio terminal 70 or on its SIM card (not illustrated). In the event of a desired update of the user data 200, this authorization code 900 must be sent back to the communication device 300. According to the invention, two-part identification can then take place. For this purpose, a check is first of all carried out in order to determine whether the authorization code 900 has been sent from a known mobile radio terminal 70 or its SIM card. If this is the case, the authorization code 900 sent from the mobile radio device 70 is then checked by the controller 120 of the access arrangement 60 in a second step. If this check is positive, the authorization data 200 in the controller 120 are updated, for example deleted, in accordance with the request 700.

This method for identifying the supplier can also be safeguarded even further by virtue of the communication device of the controller 300/310 sending, after receiving the authorization code, a request to an address (telephone number) of a mobile radio device, which has been previously stored in the controller 120 or in the communication device of the controller 310/300, for example in the form of a short message—SMS—, which request must then be confirmed within a time window, for example again by a short message containing an authorization code to the communication device of the controller 310/300.

Another possible identification method is the use of a challenge-response method described in detail above, in which case a common secret is interchanged beforehand between the controller 120 of the access arrangement 60 and the mobile radio terminal 70 belonging to the supplier or its SIM card. In this case, the mobile radio terminal 70 belonging to the supplier must be authenticated with respect to the access arrangement 60.

The use of the methods described above is advantageous not only for deleting user data 200 in the memory 90 but also for reactivating user data 200.

According to the invention, the described methods can also be applied to RKE—remote keyless entry—keys or else immobilizers.

FIG. 5 schematically shows a system for delivering mailings. The system has a memory 90 and authorization data 200 stored in the latter. The memory 90 is connected, via a data bus 950, to a first identification module which enables a first identification routine 500. A second identification module and an update module 700, which enable a second identification routine 600 and an update routine 800, are also connected to this data bus 950. Finally, the system has at least three communication modules M1, M2 and M3. A communication connection from the communication terminal 70 belonging to a supplier can be set up via a mobile radio communication network N1 using the first communication module M1. The second communication module M2 can set up a communication connection to the controller 120 of the access arrangement 60 via a second communication network N2 using the communication device 300/310 of the controller.

According to the invention, it is again possible for the authorized supplier to set up the authorization data 200 a communication connection to the system 40 with the aid of his communication terminal 70 via the communication network N1 using the communication device 100 thereof. The protocols of the communication network N1 which are specific to the communication network are used in this case. The first identification routine 500 is then used to identify the authorized supplier using one of the identification methods described above. The supplier then uses his communication terminal 70 to transmit an update request 700 to the system. A mobile radio connection to the controller 120 of the access arrangement 60 is then set up via the mobile radio communication network N2 using the second communication module M2 using the communication device 300/310 of the controller.

The system is now uniquely identified by the controller 120. The second identification routine 600 is used for this purpose.

In this case, one of the methods described above can be used for identification.

When the identification has been carried out, the authorization data 200 both in the controller 120 and in the memory 90 of the system are updated. The update routine 800 is used for this purpose. In this case, the updating is carried out in accordance with the update request 700 from the authorized supplier.

Neither the method according to the invention nor the arrangement according to the invention is restricted to the exemplary embodiments but rather can be used in all access arrangements, for example for buildings or electrical facilities which have communication devices for communicating via communication networks. In this case, the communication devices should be matched to the communication networks and identification methods used.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system (40) for delivering mailings in vehicles, comprising:
   a processor configured to execute an operating system;
   a memory (90);
   a first transmitter/receiver (M1) configured to set up a communication connection to a communication terminal (70) of a supplier of authorization data (200) via a communication network (N1);
   a first identification routine, executed by the processor and configured to uniquely identify the supplier;
   a second transmitter/receiver (M2) configured to set up a communication connection to a communication device (300) of a controller (120) of an access arrangement (60) of a vehicle via a wireless communication network (N2);
   a second identification routine, executed by the processor and configured to uniquely identify the system (40) to the access arrangement (60);
   a receiver (M3) configured to receive an item of update request information (AA) relating to a driver of the vehicle; and
   an update routine (800), executed by the processor and configured to update authorization data (200) in the memory (90),
   wherein the processor is configured to:
      communicate with and receive positional information from a parking space management system (26) and to facilitate parking of the vehicle based on the received positional information, and
      receive a position of at least one free parking space located between a first parked vehicle and a second parked vehicle nearest the first parked vehicle, the position of the at least one free parking space between the first parked vehicle and the second parked vehicle being calculated by the vehicle based on a measurement of a distance between the first parked vehicle and the second parked vehicle nearest the first parked vehicle, the measurement of the distance between the first parked vehicle and the second parked vehicle being made by the first parked vehicle.

2. The system (40) as claimed in claim 1, wherein the wireless communication network (N2) is a mobile radio communication network.

3. The system (40) as claimed in claim 1, further comprising an identifying device configured to identify a user by voice recognition, by transmitting an item of identification information—PIN/TAN—, or by a challenge-response method.

4. The system (40) as claimed in claim 1, further comprising an identifying device configured to identify a user by using an item of unique cryptographic information.

5. The system (40) as claimed in claim 1, further comprising a communication setting device configured to set up a communication connection via the wireless communication network (N2) via a mobile radio communication network and/or a WLAN network.

6. The system (40) as claimed in claim 1, further comprising:
   a communication device (100); and
   an encryption device configured to encrypt communication between the communication device (100) of the system (40) and a communication device (300/310) of the access arrangement (60) using a common secret.

* * * * *